United States Patent
Yazdi et al.

(10) Patent No.: US 6,718,605 B2
(45) Date of Patent: Apr. 13, 2004

(54) SINGLE-SIDE MICROELECTROMECHANICAL CAPACITIVE ACCELEROMETER AND METHOD OF MAKING SAME

(75) Inventors: Navid Yazdi, Malden, MA (US); Khalil Najafi, Ann Arbor, MI (US); Arvind Salian, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 277 days.

(21) Appl. No.: 09/885,953

(22) Filed: Jun. 21, 2001

(65) Prior Publication Data

US 2001/0042404 A1 Nov. 22, 2001

Related U.S. Application Data

(60) Division of application No. 09/679,849, filed on Oct. 5, 2000, now Pat. No. 6,286,369, which is a continuation-in-part of application No. 08/925,257, filed on Sep. 8, 1997, now Pat. No. 6,035,714.
(60) Provisional application No. 60/111,370, filed on Dec. 8, 1998.

(51) Int. Cl.$^7$ .......................... H01G 7/00; G01P 15/125
(52) U.S. Cl. .......................... 29/25.42; 29/831; 29/832; 29/25.41; 73/514.32; 73/514.16; 73/514.17; 73/514.18; 73/514.12
(58) Field of Search .......................... 29/25.41, 25.42, 29/831, 846; 73/514.32, 514.18, 514.16, 514.17

(56) References Cited

U.S. PATENT DOCUMENTS 4,483,194 A 11/1984 Rudolf
4,598,585 A 7/1986 Boxenhorn
4,922,756 A 5/1990 Henrion (List continued on next page.)

OTHER PUBLICATIONS

Bernstein et al., Advanced Micromachined Condenser Hydrophone, Jun. 1994, pp. 73–77.

Bernstein et al., Low–Noise MEMS Vibration Sensor for Geophysical Applications, Jun. 1998, pp. 55–58.

Selvakumar et al., High Density Vertical Comb Array Microactuators Fabricated Using A Novel Bulk/Poly–Silicon Trench Refill Technology, Jun. 1994, pp. 138–141.

Primary Examiner—Carl J. Arbes
Assistant Examiner—Tai V Nguyen
(74) Attorney, Agent, or Firm—Brooks Kushman P.C.

(57) ABSTRACT

A high sensitivity, Z-axis, capacitive microaccelerometer having stiff sense/feedback electrodes and a method of its manufacture on a single-side of a semiconductor wafer are provided. The microaccelerometer is manufactured out of a single silicon wafer and has a silicon-wafer-thick proof mass, small and controllable damping, large capacitance variation and can be operated in a force-rebalanced control loop. One of the electrodes moves with the proof mass relative to the other electrode which is fixed. The multiple, stiffened electrodes have embedded therein damping holes to facilitate force-rebalanced operation of the device and to control the damping factor. Using the whole silicon wafer to form the thick large proof mass and using thin sacrificial layers to form narrow uniform capacitor air gaps over large areas provide large-capacitance sensitivity. The manufacturing process is simple and thus results in low cost and high yield manufacturing.

9 Claims, 6 Drawing Sheets

U.S. PATENT DOCUMENTS

| | | | |
|---|---|---|---|
| 5,016,072 A | * | 5/1991 | Greiff .................. 257/418 |
| 5,129,262 A | * | 7/1992 | White et al. ............. 73/599 |
| 5,146,435 A | | 9/1992 | Bernstein |
| 5,216,490 A | | 6/1993 | Greiff et al. |
| 5,235,187 A | * | 8/1993 | Arney et al. ............ 250/306 |
| 5,345,824 A | | 9/1994 | Sherman et al. |
| 5,392,650 A | * | 2/1995 | O'Brien et al. ....... 73/514.18 |
| 5,392,651 A | | 2/1995 | Suzuki et al. |
| 5,404,749 A | | 4/1995 | Spangler |
| 5,427,975 A | | 6/1995 | Sparks et al. |
| 5,445,006 A | | 8/1995 | Allen et al. |
| 5,461,917 A | | 10/1995 | Marek et al. |
| 5,503,285 A | | 4/1996 | Warren |
| 5,535,626 A | | 7/1996 | Bullis et al. |
| 5,540,095 A | | 7/1996 | Sherman et al. |
| 5,559,290 A | | 9/1996 | Suzuki et al. |
| 5,561,248 A | | 10/1996 | Negoro |
| 5,563,343 A | | 10/1996 | Shaw et al. |
| 5,573,679 A | | 11/1996 | Mitchell et al. |
| 5,594,171 A | | 1/1997 | Ishida et al. |
| 5,595,940 A | * | 1/1997 | Trah et al. ................ 438/50 |
| 5,605,598 A | | 2/1997 | Greiff |
| 5,616,844 A | | 4/1997 | Suzuki et al. |
| 5,665,915 A | | 9/1997 | Kobayashi et al. |
| 5,719,336 A | | 2/1998 | Ando et al. |
| 5,830,777 A | | 11/1998 | Ishida et al. |
| 5,920,013 A | | 7/1999 | Boardman et al. |
| 6,030,850 A | | 2/2000 | Kurle et al. |

* cited by examiner

SINGLE-SIDE MICROELECTROMECHANICAL CAPACITIVE ACCELEROMETER AND METHOD OF MAKING SAME

CROSS-REFERENCE TO RELATED APPLICATIONS

This is a divisional of copending application Ser. No. 09/679,849 filed on Oct. 5, 2000.

This application is a continuation-in-part of copending U.S. application Ser. No. 08/925,257 filed Sep. 8, 1997 now U.S. Pat. No. 6,035,714, entitled "Microelectromechanical Capacitive Accelerometer And Method Of Making Same". This application also claims benefit of U.S. provisional application Ser. No. 60/111,370, filed Dec. 8, 1998, entitled "High Sensitivity Capacitive Microaccelerometer With A Folded-Electrode Structure".

GOVERNMENT RIGHTS

This invention was made with government support under Contract Nos. DABT63-95-C-0111 and F30602-98-2-0231, awarded by the Defense Advanced Research Projects Agency (DARPA). The government has certain rights in the invention.

TECHNICAL FIELD

This invention relates to capacitive accelerometers and, in particular, to single-side microelectromechanical capacitive accelerometers and methods of making same.

BACKGROUND ART

The constant drive toward small size, lightweight, low cost and low-power sensing systems in all application domains has made high sensitivity and precision microaccelerometers increasingly needed.

These accelerometers are used in numerous applications, such as inertial navigation and guidance, space microgravity measurements, seismology and platform stabilization. Also, as they become manufacturable at low cost with small size, they attain a large potential consumer market in their application as a GPS-aid to obtain position information when the GPS receivers lose their line-of-sight with their satellites.

High precision accelerometers are typically operated closed-loop to satisfy dynamic range, linearity and bandwidth requirements, in addition to high sensitivity and low-noise floor.

Capacitive microaccelerometers are more suitable since they provide stable DC-characteristics and high bandwidth. Such accelerometers may be fabricated by surface micromachining or bulk micromachining. The surface micromachined devices are fabricated on a single silicon wafer. However, they generally have low sensitivity and large noise floor, and thus cannot satisfy the requirements of many precision applications.

Some high resolution accelerometers are bulk micromachined and use multiple wafer bonding as part of their manufacturing process. This wafer bonding is a complex fabrication step, and hence results in lower yield and higher cost. Also, forming damping holes in the thick bonded wafers is difficult, and thus special packaging at a specified ambient pressure is typically needed to control the device damping factor. Finally, due to wafer bonding, these devices show higher temperature sensitivity and larger drift especially if glass wafers are used.

Figure 1:
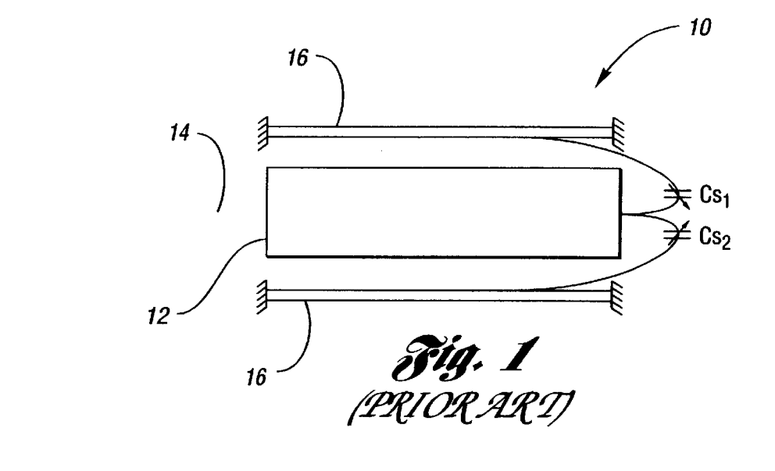
FIG. 1 is a side schematic view of a prior art closed-loop, capacitive accelerometer.
Figure 2:
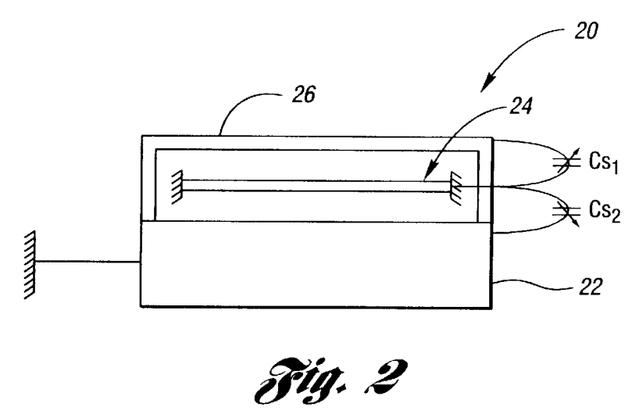
FIG. 2 is a side schematic view of a single-side, closed-loop, microelectromechanical capacitive accelerometer constructed in accordance with the present invention.

The above-noted patent application entitled "Microelectromechanical Capacitive Accelerometer And Method Of Making Same" utilizes a single wafer fabrication technology with damping holes. However, fabrication of the accelerometer requires double side processing and lead transfer from both sides of the wafer. As shown in FIG. 1, the accelerometer, generally indicated at 10, includes a proof mass 12 suspended by compliant beams 14 between two fixed and rigid electrodes 16. In the presence of an external acceleration, the proof mass 12 moves from its center position and thus $C_{S1}$ and $C_{S2}$ change in opposite directions. The proof mass 12 is rebalanced to its center position by applying an electrostatic force to either the top electrode 16 or the bottom electrode 16.

U.S. Pat. No. 5,345,824 discusses a monolithic capacitive accelerometer with its signal conditioning circuit fabricated using polysilicon proof mass and surface micromachining.

U.S. Pat. No. 5,404,749 discusses a boron-doped silicon accelerometer sensing element suspended between two conductive layers deposited on two supporting dielectric layers.

U.S. Pat. No. 5,445,006 discusses a self-testable microaccelerometer with a capacitive element for applying a test signal and piezoresistive sense elements.

U.S. Pat. No. 5,461,917 discusses a silicon accelerometer made of three silicon plates.

U.S. Pat. No. 5,503,285 discusses a method for forming an electrostatically force rebalanced capacitive silicon accelerometer. The method uses oxygen implantation of the proof mass to form a buried oxide layer and bonding of two complementary proof mass layers together. The implanted oxide layer is removed after bonding to form an air gap and release the proof mass.

U.S. Pat. No. 5,535,626 discusses a capacitive microsensor formed of three silicon layers bonded together. There is glass layer used between each two bonded silicon pairs.

U.S. Pat. No. 5,540,095 discusses a monolithic capacitive accelerometer integrated with its signal conditioning circuitry. The sensor comprises two differential sense capacitors.

U.S. Pat. No. 5,559,290 discusses a capacitive accelerometer formed of three silicon plates, attached together using a thermal oxide interface.

U.S. Pat. No. 5,563,343 discusses a lateral accelerometer fabricated of a single crystal silicon wafer.

U.S. Pat. No. 5,605,598 discloses a monolithic micromechanical vibrating beam accelerometer having a trimmable resonant frequency and method of making same.

U.S. Pat. Nos. 5,594,171 and 5,830,777 disclose capacitance-type acceleration sensors and methods for manufacturing the sensors. The sensors include a mass portion having a plurality of movable electrodes. The sensors also include a plurality of stationary electrodes. The sensors are manufactured on a single-side of a substrate.

U.S. Pat. No. 5,665,915 discloses a semiconductor capacitive acceleration sensor. The construction of the sensor includes a base substrate having a first electrode attached to the top of the substrate. The sensor also includes a second electrode positioned between the substrate and the first electrode. The first electrode is a stationary electrode and the second electrode is a movable electrode.

U.S. Pat. No. 5,719,336 discloses a capacitive acceleration sensor having a first fixed electrode, a second fixed electrode, a first movable electrode, and a second movable electrode. The stationary electrodes are positioned in a configuration surrounding the movable electrodes.

U.S. Pat. Nos. 5,392,651; 5,427,975; 5,561,248; 5,616,844; and 5,719,069 disclose various configurations of microminiature accelerometers having both stationary and movable electrodes, wherein the electrodes are arranged in various configurations.

The paper entitled "Advanced Micromachined Condenser Hydrophone" by J. Bernstein et al, Solid-State Sensor and Actuator Workshop, Hilton Head, S.C., June, 1994, discloses a small micromechanical hydrophone having capacitor detection. The hydrophone includes a fluid-filled variable capacitor fabricated on a monolithic silicon chip.

The paper entitled "Low-Noise MEMS Vibration Sensor for Geophysical Applications" by J. Bernstein et al., Digest of Hilton-Head Solid State Sensor and Actuator Workshop, pp. 55–58, June, 1998, discloses an accelerometer having trenches etched in its proof mass to reduce damping and noise floor.

The paper entitled "High Density Vertical Comb Array Microactuators Fabricated Using a Novel Bulk/Poly-Silicon Trench Refill Technology", by A. Selvakumar et al., Hilton Head, S.C., June 1994, discloses a fabrication technology which combines bulk and surface micromachining techniques. Trenches are etched and then completely refilled.

Numerous U.S. patents disclose electroplated microsensors such as U.S. Pat. Nos. 5,216,490; 5,595,940; 5,573,679; and 4,598,585.

Numerous U.S. patents disclose accelerometers such as U.S. Pat. Nos. 4,483,194 and 4,922,756.

U.S. Pat. No. 5,146,435 discloses an acoustic transducer including a perforated plate, a movable capacitor plate and a spring mechanism, all of which form a uniform monolithic structure from a silicon wafer.

DISCLOSURE OF INVENTION

An object of the present invention is to provide a single-side, microelectromechanical capacitive accelerometer including a fixed electrode suspended between a proof mass and a moving electrode to provide differential capacitance measurement and force-rebalancing.

Another object of the present invention is to provide a single-side, microelectromechanical capacitive accelerometer formed from a single wafer with a proof mass having a thickness substantially equal to the thickness of the wafer, controllable/small damping and large capacitance variation.

Yet another object of the present invention is to provide a single-side, microelectromechanical capacitive accelerometer wherein packaging and potential integration of the device with its CMOS interface circuitry is simplified since all interconnect leads are on one side of the wafer.

In carrying out the above objects and other objects of the present invention, a microelectromechanical capacitive accelerometer manufactured on a single-side of a semiconductor wafer is provided. The accelerometer includes a fixed electrode, a movable proof mass having a top surface and a movable electrode. The movable electrode is attached to the top surface of the proof mass to move therewith. The fixed electrode is suspended between the proof mass and the movable electrode.

The accelerometer has an input axis and, preferably, both of the electrodes are sufficiently stiff to electrostatically force-balance proof mass displacement due to acceleration along the input axis without substantial bending of the electrodes along the input axis.

Each of the electrodes includes a planar layer which is relatively thin along the input axis and, preferably, at least one of the planar layers is dimensioned and is formed of a material so that its electrode is stiff along the input axis.

Each of the electrodes may include an electroplated planar layer.

The accelerometer may include upper and lower beams for suspending the proof mass in spaced relationship from the fixed electrode.

Preferably, the fixed electrode includes a plurality of stiffeners extending from its planar layer along the input axis to stiffen the fixed electrode. The stiffeners extend toward the proof mass from their planar layer. The proof mass includes a plurality of cavities on its top surface. The stiffeners are received within the cavities. The stiffeners and the proof mass have a substantially uniform, narrow air gap therebetween.

The planar layer and the stiffeners are preferably formed of different forms of the same material such as a semiconductor material like silicon.

Also, preferably, each of the planar layers of the electrodes has a plurality of damping holes formed completely therethrough.

The proof mass is typically formed from a single silicon wafer having a predetermined thickness and wherein the thickness of the proof mass is substantially equal to the predetermined thickness. At least one of the planar layers and the proof mass are, preferably, formed of different forms of semiconductor material.

Further in carrying out the above objects and other objects of the present invention, a single-side, microelectromechanical capacitive accelerometer having an input axis is provided. The accelerometer includes first and second spaced conductive electrodes. Each of the conductive electrodes includes a planar layer which is relatively thin along the input axis, but is stiff to resist bending movement along the input axis. The accelerometer also includes a proof mass which is thicker than either of the planar layers by at least one order of magnitude along the input axis. The accelerometer further includes a first support structure for supporting the proof mass in spaced relationship from the first conductive electrode, and a second support structure for supporting the second conductive electrode on the proof mass. The second conductive electrode moves with but is electrically isolated from the proof mass. The second conductive electrode and the proof mass move together in opposite directions relative to the first conductive electrode. The conductive electrodes and the proof mass form a pair of substantially uniform, narrow air gaps on opposite sides of the first conductive electrode. The conductive electrodes and the proof mass form a pair of acceleration-sensitive capacitors.

Preferably, both of the conductive electrodes are sufficiently stiff to electrostatically force-balance proof-mass displacement due to acceleration along the input axis without substantial bending of the conductive electrodes along the input axis.

At least one of the planar layers may be dimensioned and is formed of a material so that its conductive electrode is stiff along the input axis.

At least one of the planar layers may be an electroplated planar layer.

The first conductive electrode preferably includes a plurality of stiffeners extending from its planar layer along the input axis to stiffen the first conductive electrode. The stiffeners extend towards the proof mass which includes a plurality of cavities which receive the stiffeners. The stiffeners and the proof mass have one of the substantially uniform, narrow air gaps therebetween. The planar layer of the first conductive electrode and the stiffeners are formed of different forms of the same material. Preferably, the material is a semiconductor material such as silicon.

The first conductive electrode preferably comprises a plurality of co-planar, electrically isolated conductive electrodes.

Preferably, the proof mass is formed from a single silicon wafer having a predetermined thickness. The thickness of the proof mass is substantially equal to the predetermined thickness.

Also, preferably, the planar layer of at least one of the conductive electrodes has a plurality of damping holes formed completely therethrough.

The first support structure preferably includes a plurality of beams for suspending the proof mass at upper and lower portions of the proof mass.

Yet still further in carrying out the above objects and other objects of the present invention in a method for making a high-sensitivity, microelectromechanical capacitive accelerometer including a proof mass having a thickness along an input axis of the accelerometer and first and second conductive electrode from a single semiconductor wafer having a predetermined thickness, an improvement is provided. The improvement includes the steps of depositing first and second planar layers on a single-side of the wafer. The planar layers are relatively thin along the input axis. The method also includes the step of stiffening the first and second planar layers to form the first and second conductive electrodes, respectively, which are stiff so as to resist bending movement along the input axis. The method then includes the step of forming substantially uniform first and second narrow gaps between the first conductive electrode and the proof mass and between the second conductive electrode and the first conductive electrode, respectively. The thickness of the proof mass is at least one order of magnitude greater than either the thickness of the first planar layer or the thickness of the second planar layer.

Preferably, the thickness of the proof mass is substantially equal to the predetermined thickness of the wafer and the semiconductor wafer is a silicon wafer.

The step of stiffening may include the step of forming a stiffening metallic layer on at least one of the planar layers.

The step of stiffening may include the step of forming stiffening ribs on at least one of the planar layers.

The step of forming the stiffening ribs, preferably, includes the steps of forming trenches in the proof mass and refilling the trenches with a sacrificial layer having a substantially uniform thickness and an electrode material. The step of forming the substantially uniform, first narrow air gap then includes the step of removing the sacrificial layer.

The step of stiffening may include the step of electroplating the first and second planar layers.

The method may also include the step of forming a plurality of beams for supporting the proof mass at upper and lower portions of the proof mass.

Several significant innovative features of the accelerometer structure and its manufacturing technique include: 1) forming both fixed and moving sense/feedback electrodes with embedded damping holes using stiffened deposited polysilicon layers or electroplated metal layers; 2) forming electrically-isolated stand offs on a top surface of a thick proof mass for the moving sense/feedback electrode; 3) forming uniform narrow gaps over a large area between the two electrodes and between the fixed electrode and the proof mass by etching sacrificial layers; and 4) using a single silicon wafer for manufacturing on a single-side thereof the accelerometer without any need for wafer bonding.

The sensor typically is operated in a closed-loop mode. Preferably, a switched-capacitor, sigma-delta modulator circuit is utilized to force-rebalance the proof mass and provide direct digital output for the accelerometer.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 3:
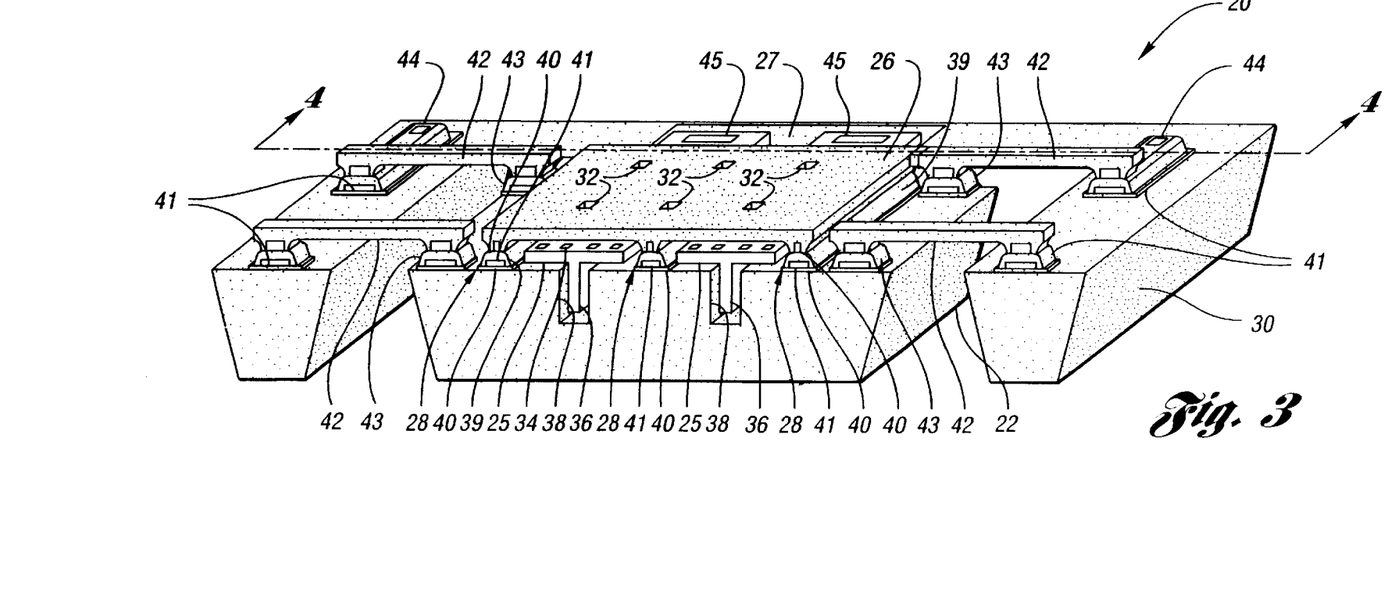
FIG. 3 is a schematic, perspective view, in cross-section, of an accelerometer constructed in accordance with a first embodiment of the present invention with the thicknesses of the electrodes greatly exaggerated for illustrative purposes.
Figure 4:
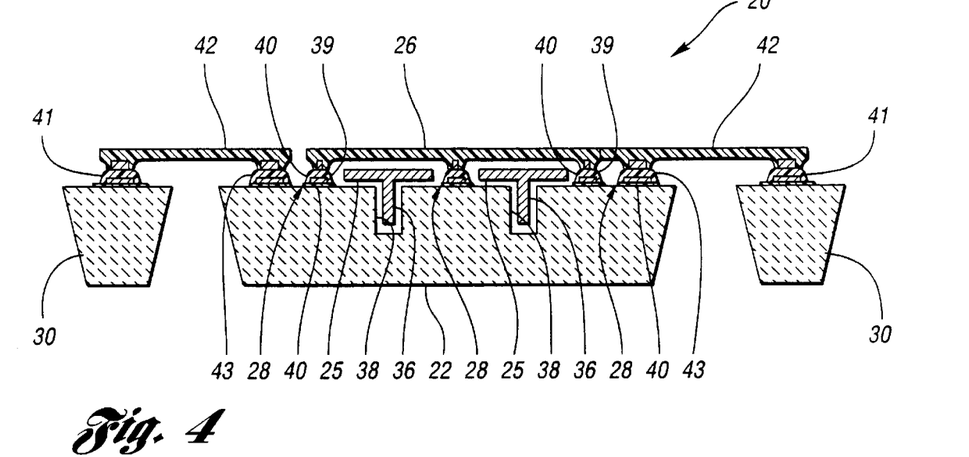
FIG. 4 is a sectional view of the accelerometer of FIG. 3 taken along linens 4—4.
Figure 5:
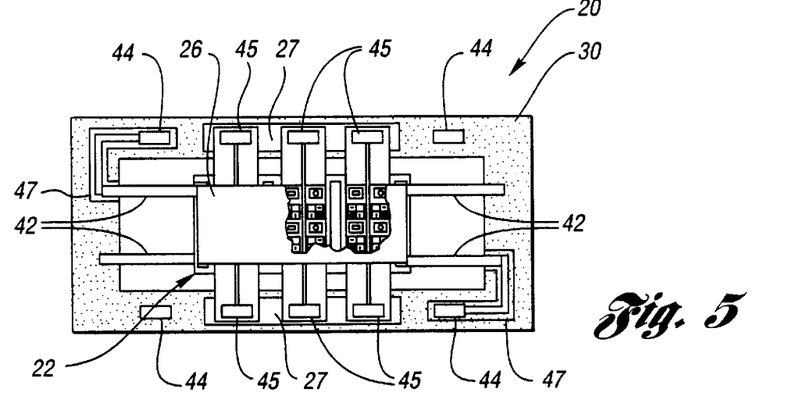
FIG. 5 is a top plan view, partially broken away, of the accelerometer of FIG. 3.

In general, an accelerometer, generally indicated at 20 in FIGS. 2–5 of the present invention, and its manufacturing technology address are substantially all high-precision, accelerometer design issues. The method of the present invention combines both surface and bulk micromachining in order to achieve high device sensitivity, low noise floor, and controllable damping—all by performing fabricating steps on a single-side of a single silicon wafer. The central idea of the present invention is to perform fabricating steps to a single-side of a wafer while at the same time utilizing the whole wafer thickness to attain a large silicon proof mass 22 (i.e. typically about 450 microns thick for a four inch silicon wafer) together with top and middle stiffened conductive electrodes 26 and 24, respectively, of the accelerometer 20. The middle stiffened conductive electrode 24 may comprise a plurality of electrically-isolated, fixed conductive electrodes 25 which overlay an isolation dielectric layer 27 at their opposite ends as illustrated in FIGS. 3–5. The top stiffened conductive electrode 26 is supported on and is electrically isolated from the proof mass 22 by standoffs, generally indicated at 28 in FIGS. 3 and 4.

The electrodes 25 of the fixed electrode 24 are supported at their opposite ends on a support rim 30 in fixed relationship to the moving electrode 26 and the proof mass 22. The top electrode 26 is anchored to a top surface of the proof mass 22 so that it moves with the proof mass 22. Therefore, the fixed electrode 24 is suspended between the movable proof mass 22 at its bottom and the moving electrode 26 at its top. This permits force rebalancing and differential capacitance sensing without the need for sandwiching the thick proof mass 22 between two fixed electrodes. Hence, the "folded-electrode" structure of FIG. 2 allows realization of accelerometers with thick, large proof mass and thin stiff electrodes on only one side of a silicon wafer. By incorporating damping holes 32 in the electrode 26 and damping holes 34 in the electrodes 25 of the fixed electrode 24, squeeze film damping can be controlled and reduced.

High-Sensitivity Accelerometer

FIGS. 3–4 show the structure of the high sensitivity accelerometer or device 20 with the "folded-electrode" structure (i.e. the top electrode 26 is "folded" from the bottom surface of the proof mass 22 to its top surface). It has high-capacitance sensitivity by using a whole wafer thickness to obtain the large proof mass 22, and thin sacrificial layers during the fabrication process to form uniform, narrow gaps over large areas of the accelerometer. The device 20 is all-silicon and fabricated on a single wafer by utilizing polysilicon electrodes 24 and 26 each of which has a planar layer which is relatively thin.

The thin, middle electrode 24 is made rigid by embedding thick vertical stiffeners 36 in its planar layer as described in the above-noted utility patent application. The thick stiffeners 36 are formed by thin film deposition and refilling high aspect-ratio trenches 38 in the proof mass 22.

The top electrode 26 is made rigid by making it short and wide, and supporting it through the electrically-isolated standoffs 28 on the top surface of the proof mass 22. These standoffs 28 are formed by a first poly 39, and dielectric layers 40 at top and bottom surfaces of the first poly 39. Sacrificial oxide dielectric layers 41 between the proof mass 22 and first poly 39 are sealed by the poly dielectric layers 40 and kept at the anchors 28 to bring the anchor height to the level of a second poly which forms the electrodes 25.

In this manner, the curvature of the top electrode 26 at the anchors 28 is reduced which helps to reduce spring softening effect at the anchors 28. Also, anchor parasitic capacitances are reduced by keeping the layers 41 of sacrificial oxide.

Figure 6:
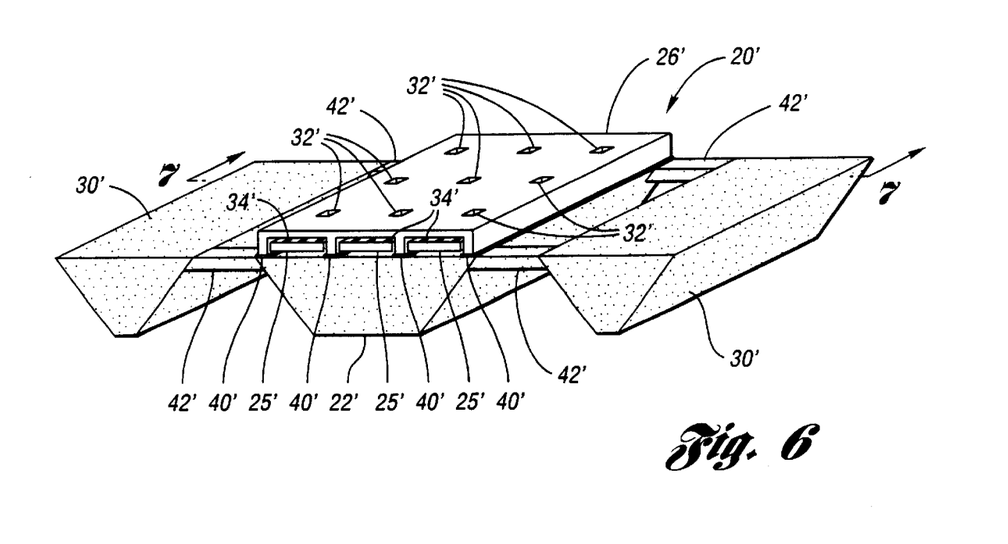
FIG. 6 is a view similar to the view of FIG. 3 of a second embodiment of the invention.
Figure 7:
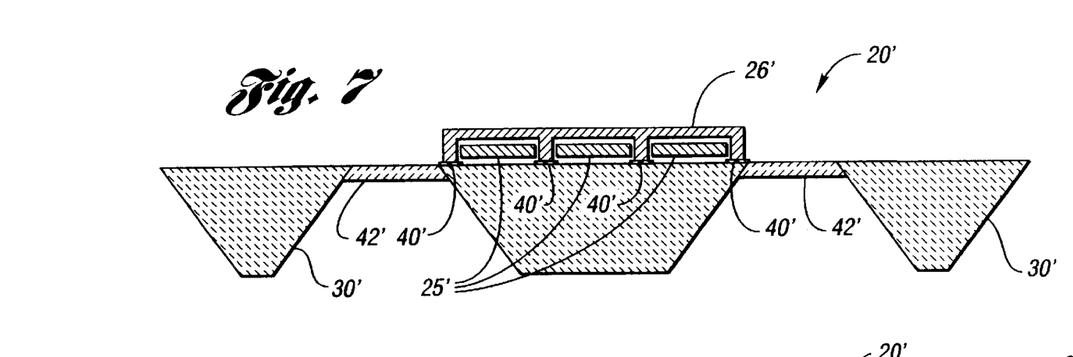
FIG. 7 is a sectional view of the accelerometer of FIG. 6.

In order to verify the effectiveness of the geometrical design to form the rigid electrodes 24 and 26 with thin film deposition, the stiffness of the middle and top electrodes 24 and 26 for different geometries are calculated and shown in FIGS. 6 and 7, respectively. These calculations are based on mechanical design equations for uniformly loaded beams and plates since the electrodes 24 and 26 will be typically uniformly loaded by the electrostatic feedback force.

Figure 11:
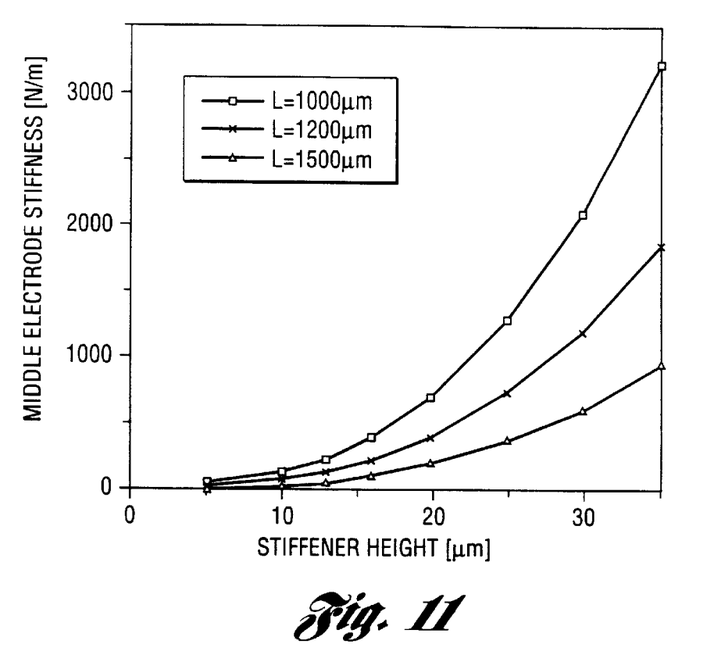
FIG. 11 is a graph of calculated, middle-electrode stiffness vs. vertical stiffener height for different plate lengths for the embodiment of FIGS. 3–5.

FIG. 11 shows the calculated middle electrode stiffness versus vertical stiffener height for different plate lengths for the embodiment of FIGS. 3–5. The electrode thickness is 2.5 $\mu$m, and the width is 200 $\mu$m.

Figure 12:
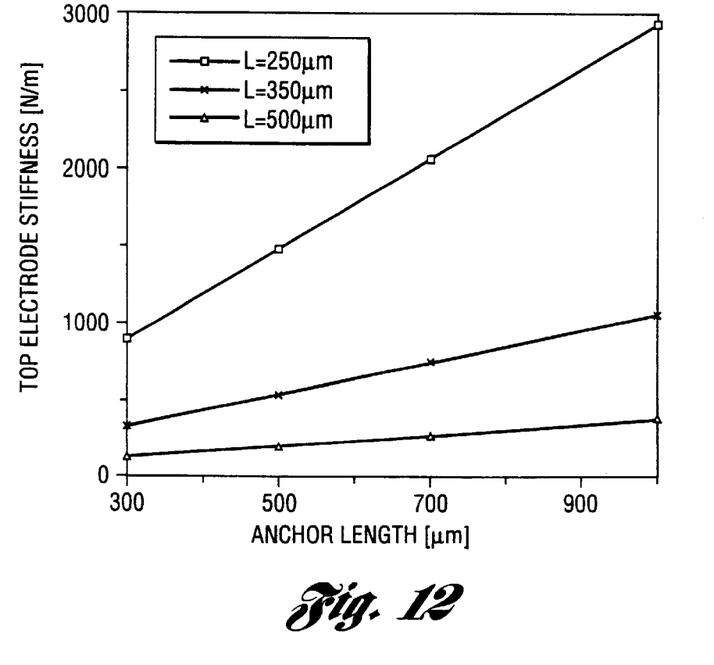
FIG. 12 is a graph of calculated, top-electrode stiffness vs. support anchor length (plate width) for various anchor separations (plate length) for the embodiment of FIGS. 3–5.

The calculated top electrode stiffness versus the support anchor length (plate width) for various anchor separation (plate length) is shown in FIG. 12 for the embodiments of FIGS. 3–5. The electrode thickness is 2 $\mu$m and spring softening effects due to the non-straight plate shape near the anchors are not considered. As can be seen, a stiffness of several hundred to a few thousand N/m's is achievable. For instance, an accelerometer 20 fabricated with a 2.6 mm×1 mm proof mass 22 and nine isolated middle electrodes 25 has calculated middle and top electrode stiffnesses of 1240 [N/m] and 2000 [N/m], respectively. These are well above the minimum required stiffness of 200 [N/m] that electromechanical simulations of the closed-loop accelerometer 20 have indicated.

Referring again to FIGS. 3–5, accelerometer damping is reduced by forming the holes 34 in the electrodes 25 of the middle electrode 24. Hence, the device 20 can achieve a sub-$\mu$g mechanical noise floor at atmosphere without vacuum packaging. Metal pads 45 are formed at opposite ends of the electrodes 25.

Holes 32 created in the top electrode 26 provide access for sacrificial etchant and also help reduce the damping.

The proof mass 22 is suspended by polysilicon beams 42 supported on the support rim 30 by anchors 41 and by anchors 43 on the proof mass 22. The beams 42 also provide lead transfers from the top electrode 26 and the proof mass 22 to metal pads 44 on the anchors 41 supported on an isolation dielectric layer 47 on the rim 30. A full folded-beam or straight beam bridge suspension configuration is used to obtain low cross axis sensitivity.

Figure 8:
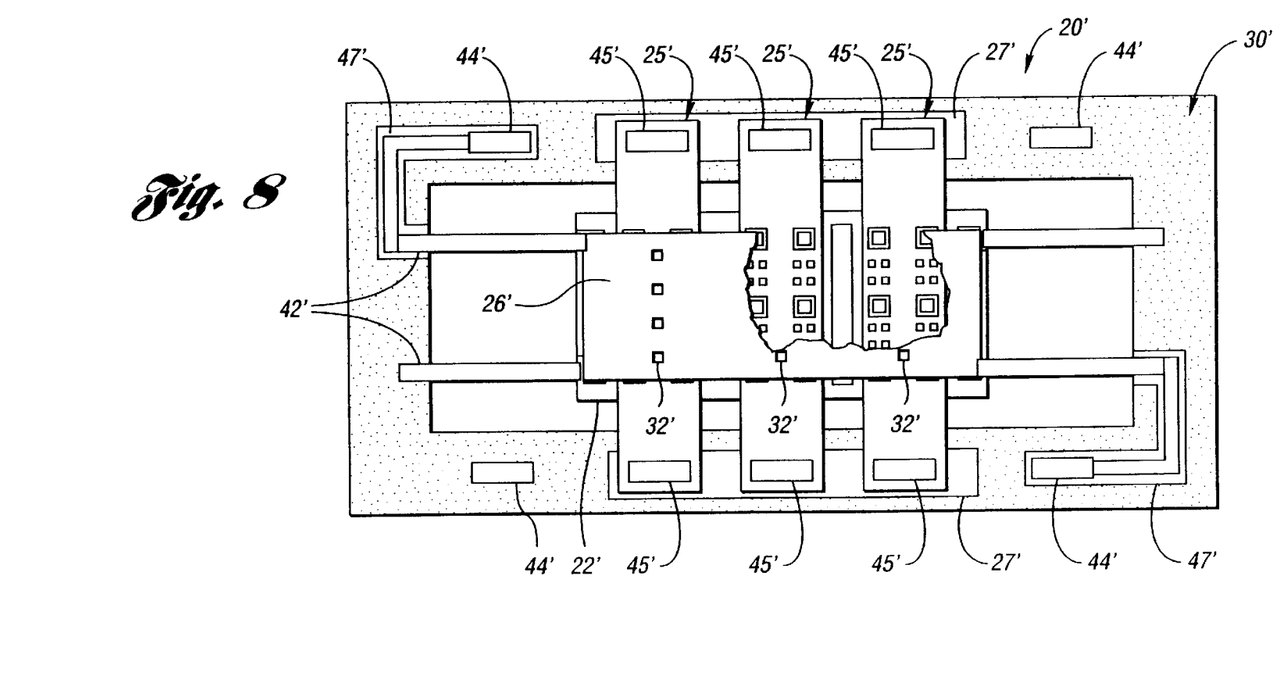
FIG. 8 is a view similar to the view of FIG. 5 of the second embodiment.

Referring now to FIGS. 6–8, there is illustrated a second embodiment of a microelectromechanical capacitive accelerometer, generally indicated at 20'. Items shown in FIGS. 6–8 which are substantially the same in structure and function as those items shown in FIGS. 3–5 have the same reference numeral but have a single prime designation.

Figure 9:
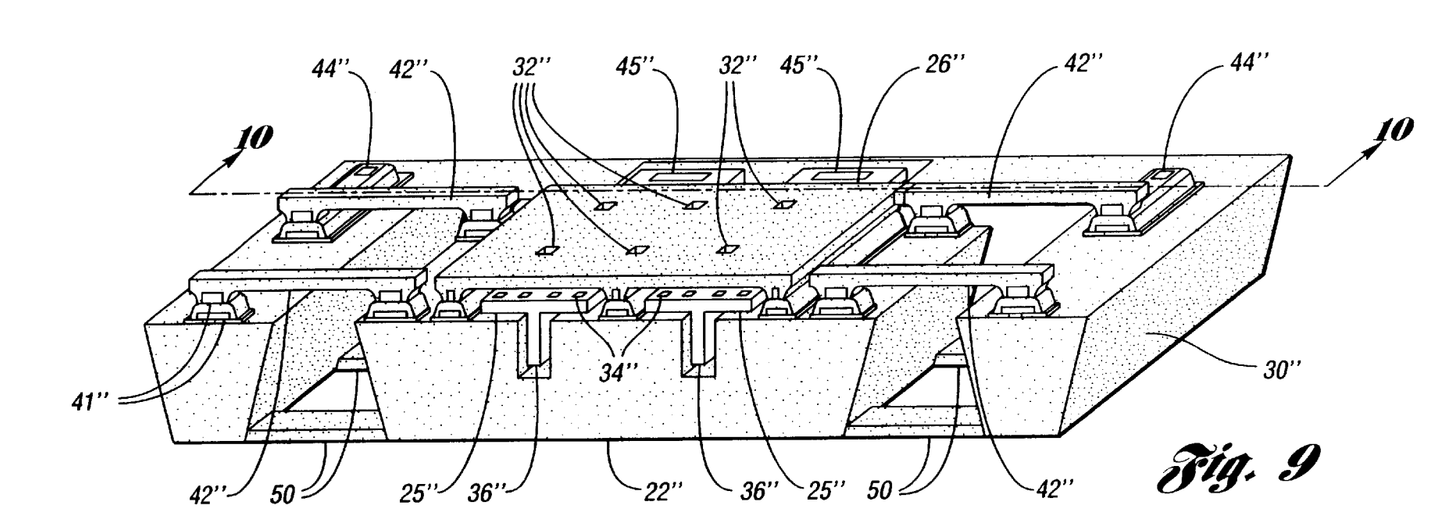
FIG. 9 is a view similar to the views of FIGS. 3 and 6 of a third embodiment of the invention.
Figure 10:
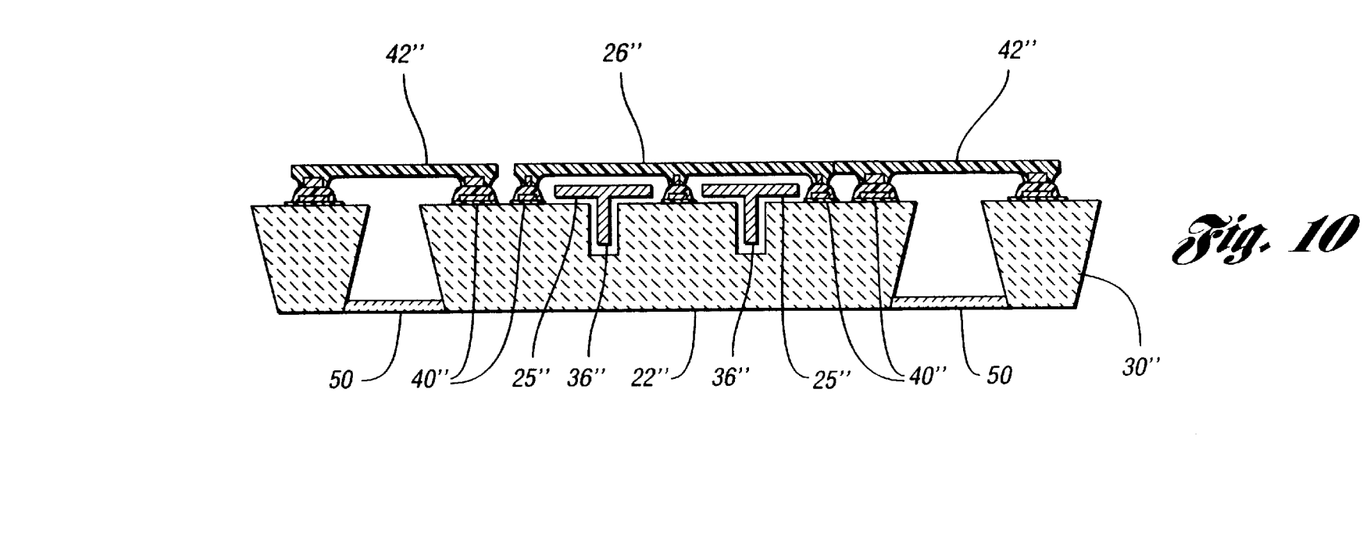
FIG. 10 is a sectional view of the accelerometer of FIG. 9.

Referring now to FIGS. 9 and 10, there is illustrated a third embodiment of a microelectromechanical capacitive accelerometer, generally indicated at 20". Items shown in FIGS. 9 and 10 which are substantially the same in structure and invention as those items shown in FIGS. 3–5 have the same reference numeral but have a double prime designation.

Referring again to FIGS. 6–8, the accelerometer 20' has thick electroplated metal sense/feedback electrodes 25' and 26'. The accelerometer 20' also has a silicon proof mass 22' and suspension beams 42'. The electrodes 25' and 26' are made stiff in the sense direction by using a thick electroplated layer, as shown in FIGS. 6–8 which are the perspective, cross-sectional and top views, respectively, of the accelerometer 20'. The electroplating method of manufacturing allows a thick stiff plate formation without any need for embedded vertical stiffeners of the first embodiment of FIGS. 3–5. Moreover, the electroplating fabrication process is performed at a low temperature process which is compatible to be a post-process for microelectronic circuitry. Hence, a full-monolithic, high-precision microaccelerometer with interface circuitry can be manufactured at low cost and in a large volume.

Referring again to FIGS. 9 and 10, there is illustrated an improved accelerometer 20" which includes four additional support beams 50 at the bottom of proof mass 22". This structure provides an almost symmetrical proof mass support and results in lower accelerometer cross-axis sensitivity. The additional support beams 50 can be preferably formed by shallow boron diffusion at the first masking step of fabrication process. As described herein, in this step both sides of the silicon wafer are patterned and aligned together, and the bottom support beam patterns can be also included without any additional processing.

Fabrication Process

The fabrication process for the embodiment of FIGS. 3–5 consists of twelve masking steps on the frontside and a masking step on the backside of a single silicon wafer for the proof mass release. The process starts with a shallow p++ boron diffusion on <100>double-polished p-type Si wafer, using thermal oxide as a mask. Front and backside of the wafer are patterned with different masks and the patterns are aligned to each other. The shallow boron diffusion defines the proof mass 22 and the supporting rim 30.

Then, a LPCVD nitride $O_2$ layer is deposited and patterned to form the first poly electrode anchors 28 and isolation dielectric under the middle poly electrode dimples. The next masking step is etching trenches 38 to define the middle electrode vertical stiffeners 36.

The trenches 38 are then refilled completely using sacrificial LPCVD oxide and LPCVD polysilicon. Two patterning steps are performed on the sacrificial oxide prior to the polysilicon deposition to form dimples inside the middle electrodes 25 and the anchors on the rim 20 for the middle electrode 24 and the top poly anchors 28 on the proof mass 22. The dimples reduce the contact area and help to avoid stiction. The polysilicon film is patterned to form the middle electrodes 25 and their damping holes 34, in addition to the supports 28 for the top poly.

Next, LPCVD nitride is deposited and patterned to form the second poly electrode anchors 43 and isolation dielectric under the top poly electrode dimples. Then, sacrificial LPCVD oxide is deposited to define the air gap between top and middle electrodes 24 and 26, respectively. Similar to the patterning steps performed on the first sacrificial oxide, the deposited oxide layer is patterned in two consequent steps to form the dimples and anchors 28 for the top poly electrode 26. In fact, the mask layout is designed so that the latter three masking steps use the same masks that are already used to form the first poly nitride and oxide anchors, and dimples.

A LPCVD polysilicon is then deposited and patterned to form the top electrode 26, proof mass support, and top electrode lead transfer beams 42. The top poly electrode 26 is sealed with thin LPCVD oxide in the next step. This oxide is patterned to form metal contacts to poly electrodes and silicon rim 30. The wafer is then patterned for Chromium (Cr)/Au (400 Å/5000 Å) sputtering and lift-off. In each masking step all the deposited films on the backside is stripped before going to the next step. However, the last deposited oxide layer is patterned using the backside mask, and the proof mass 22 is released from backside using a combination of Deep RIE and net silicon etch. Finally, the device is completely released after etching the sacrificial oxide in diluted hydrofluric acid solution.

Fabrication & Measurement Results

A number of prototype microaccelerometers have been fabricated and tested. A device with a 2.6 mm×1 mm proof mass and 9 electrically isolated middle electrodes 25 have been formed. The proof mass 22 had a rectangular shape to produce a large sense capacitance area without making the middle electrodes 25 too long. Top and bottom air gaps uniformly separated the electrodes 24 and 26 from each other, and the proof mass 22 from the middle electrode 24 and its stiffeners 36.

A summary of device specifications and measured parameters is presented in Table 1.

TABLE 1

| Parameter | Calculated | Measured |
| --- | --- | --- |
| Proof mass Size | 2.7 mgr | 2600 × 1000 $\mu m^2$ |
| Resonant Frequency | 100 Hz | — |
| Suspension Beam Stiffness | 1.1 N/m | — |
| Middle Electrode Stiffness | 2400 N/m | 1000 N/m |
| Top Electrode Stiffness | 1240 N/m | 650 N/m |
| Number of Electrodes | — | 9 |
| Open-Loop Sensitivity of a single Electrode | 13.3 pF/g | 11.2 pF/g |
| Open-Loop Sensitivity | 120 pF/g | 100.3 pF/g |
| Mechanical Noise | <0.18 $\mu g/\sqrt{Hz}$ | — |

The middle electrode stiffness was obtained by measuring its pull-in voltage (19V) with the proof mass 22 held fixed by a probe tip. Similarly, the top electrode pull-in voltage is measured (16V) with the middle electrode 24 and the proof mass 22 held in-place. The measured stiffnesses of the electrodes 24 and 26 are less than the expected calculated values, which is mostly due to not considering the shape spring-softening effects and the polysilicon internal stress in the calculations. Nevertheless, the measured stiffnesses of the middle and top electrodes 24 and 26, respectively, are 2–3 orders of magnitude more rigid than the proof mass support beams 42 and above the proper closed-loop operation requirement.

Figure 13:
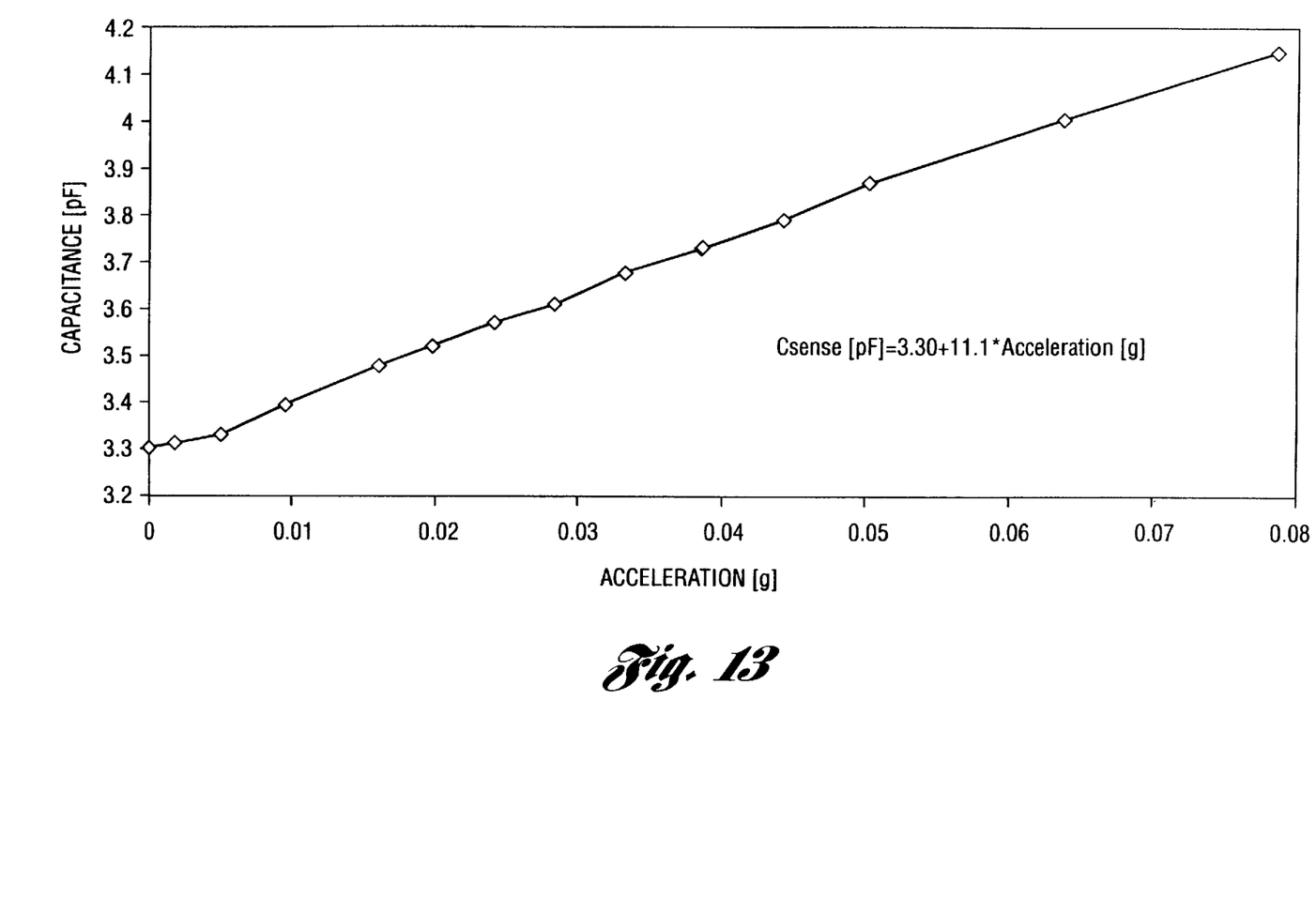
FIG. 13 is a graph of single-electrode, open-loop capacitance vs. input acceleration for the embodiment of FIGS. 3–5.

The accelerometer open-loop sensitivity was measured electrostatically for the embodiment of FIGS. 3–5. FIG. 13 shows the sensitivity versus input acceleration for 1-of-9 electrodes. The input acceleration range is limited and hence a linear response is obtained indicating a sensitivity of 11.1 pF/g per electrode—which is equivalent to a sensitivity of 100.3 pF/g for the accelerometer 20. The mechanical noise floor at atmospheric pressure is calculated to be 0.18 $\mu g/\sqrt{Hz}$. This calculation is based on considering only the squeeze film damping with the damping holes 32 and 34. As can be observed, a sub-$\mu g$ noise floor can be achieved without a need for vacuum packaging.

SUMMARY

A high sensitivity capacitive silicon accelerometer 20 with a new folded-electrode structure is described herein. The structure provides closed-loop operation and differential capacitance measurement by using a fixed rigid electrode 24 suspended between the proof mass 22 and a stiff moving electrode 26. High device sensitivity is achieved by forming the thick silicon proof mass 22 and a narrow uniform air gap over a large area. The device 20 is all silicon and fabricated on one side of a wafer. The electrodes 24 and 26 are formed by deposited polysilicon, and are made rigid by embedded high aspect-ratio stiffeners 36 or proper geometrical design. The mechanical noise floor is reduced by incorporating damping holes 32 and 34 in the electrodes, 26 and 24, respectively. The measured sensitivity for the device 20 with 2.6 mm×1 mm proof mass 22 and 1.4 $\mu m$ air gap is≈100 pF/g. The calculated mechanical noise floor for the same device 20 is 0.18 $\mu g/\sqrt{Hz}$ at atmosphere.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In a method for making a high-sensitivity, microelectromechanical capacitive accelerometer including a proof mass having a thickness along an input axis of the accelerometer and first and second conductive electrodes from a single semiconductor wafer having a predetermined thickness, the improvement comprising:

depositing first and second planar layers on a single-side of the wafer, the planar layers being relatively thin along the input axis;

stiffening the first and second planar layers to form the first and second conductive electrodes, respectively, which are stiff so as to resist bending movement along the input axis; and forming substantially uniform, first and second narrow gaps between the first conductive electrode and the proof mass and between the second conductive electrode and the first conductive electrode, respectively, wherein the first electrode is suspended above the proof mass and wherein the second electrode is supported on the proof mass to move therewith relative to the first electrode and wherein the thickness of the proof mass is at least one order of magnitude greater than either the thickness of the first planar layer or the thickness of the second planar layer.

2. The method as claimed in claim 1, wherein the thickness of the proof mass is substantially equal to the predetermined thickness of the wafer.

3. The method as claimed in claim 1, wherein the semiconductor wafer is a silicon wafer.

4. The method as claimed in claim 1 wherein the step of stiffening includes the step of forming a stiffening metallic layer on at least one of the planar layers.

5. The method as claimed in claim 1 wherein the step of stiffening includes the step of forming stiffening ribs on at least one of the planar layers.

6. The method as claimed in claim 5 wherein the step of forming the stiffening ribs includes the steps of forming trenches in the proof mass and refilling the trenches with a sacrificial layer having a substantially uniform thickness and an electrode material and wherein the step of forming the substantially uniform, first narrow air gap includes the step of removing the sacrificial layer.

7. The method as claimed in claim 1 wherein the step of stiffening includes the step of electroplating the first and second planar layers.

8. The method as claimed in claim 1 further comprising forming a plurality of beams for suspending the proof mass at upper and lower portions thereof.

9. In a method for making a high-sensitivity, microelectromechanical capacitive accelerometer including a proof mass having a thickness along an input axis of the accelerometer and first and second conductive electrodes from a single semiconductor wafer having a predetermined thickness, the improvement comprising:

depositing first and second planar layers on a single-side of the wafer, the planar layers being relatively thin along the input axis;

stiffening the first and second planar layers to form the first and second conductive electrodes, respectively, which are stiff so as to resist bending movement along the input axis; and forming substantially uniform, first and second narrow gaps between the first conductive electrode and the proof mass and between the second conductive electrode and the first conductive electrode, respectively, wherein the thickness of the proof mass is at least one order of magnitude greater than either the thickness of the first planar layer or the thickness of the second planar layer wherein the step of stiffening includes the step of forming stiffening ribs on at least one of the planar layers and wherein the step of forming the stiffening ribs includes the steps of forming trenches in the proof mass and refilling the trenches with a sacrificial layer having a substantially uniform thickness and an electrode material and wherein the step of forming the substantially uniform, first narrow air gap includes the step of removing the sacrificial layer.

* * * * *